US012583456B2

(12) United States Patent
Romero et al.

(10) Patent No.: US 12,583,456 B2
(45) Date of Patent: Mar. 24, 2026

(54) PROBABILISTIC DRIVING BEHAVIOR MODELING SYSTEM FOR A VEHICLE

(71) Applicant: GM Global Technology Operations LLC, Detroit, MI (US)

(72) Inventors: Rodolfo Valiente Romero, Calabasas, CA (US); Hyukseong Kwon, Thousand Oaks, CA (US); Marcus James Huber, Saline, MI (US); Alireza Esna Ashari Esfahani, Novi, MI (US); Michael Cui, Winnetka, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 18/340,249

(22) Filed: Jun. 23, 2023

(65) Prior Publication Data

US 2024/0425050 A1     Dec. 26, 2024

(51) Int. Cl.
  *B60W 30/18*        (2012.01)
  *B60W 40/02*        (2006.01)
  *B60W 60/00*        (2020.01)

(52) U.S. Cl.
  CPC ...... *B60W 30/18163* (2013.01); *B60W 40/02* (2013.01); *B60W 60/001* (2020.02); *B60W 2555/20* (2020.02)

(58) Field of Classification Search
  CPC ......... B60W 30/18163; B60W 60/001; B60W 40/02; B60W 2555/20; B60W 50/0097;
  (Continued)

(56) References Cited

U.S. PATENT DOCUMENTS 6,445,308 B1    9/2002  Koike
6,792,803 B2 *  9/2004  Bauer ..................... B60T 8/172
                                            73/488

(Continued)

FOREIGN PATENT DOCUMENTS

CN         113291308 B  *  4/2022  ...... B60W 30/18163
DE    102004009515 A1     9/2004

(Continued)

OTHER PUBLICATIONS

DE-102016211208-A1 machine translation (Year: 2016).*

(Continued)

*Primary Examiner* — Angelina M Shudy
(74) *Attorney, Agent, or Firm* — Vivacqua Crane, PLLC

(57)        ABSTRACT

A hybrid probabilistic driving behavior modeling system conditioned on weather for a vehicle includes one or more controllers executing instructions to determine, by a longitudinal driving model stored by the one or more controllers, a probabilistic longitudinal velocity of the vehicle with respect to a current weather condition based on a car-following model, a semantic rule system, and a speed and visibility model. The current weather condition indicates an adverse weather condition impacting driving conditions for the vehicle. The one or more controllers determine, by a probabilistic lateral driving model by the one or more controllers, one or more lane choices for the vehicle with respect to the current weather condition based on a route plan of the vehicle and perception data indicative of an environment surrounding the vehicle and selects a final lane choice from the one or more lane choices.

20 Claims, 5 Drawing Sheets

(58) Field of Classification Search

CPC ..... B60W 60/00182; G05D 1/00; G08G 1/00; G01C 21/00

See application file for complete search history.

(56) References Cited

U.S. PATENT DOCUMENTS

| | | | | |
|---|---|---|---|---|
| 8,095,300 | B2 * | 1/2012 | Villaume | G01C 23/00 244/230 |
| 10,328,935 | B2 * | 6/2019 | O'Dea | B60W 60/0015 |
| 11,023,749 | B2 * | 6/2021 | Garimella | B60W 30/18163 |
| 11,388,548 | B2 * | 7/2022 | Wirola | H04W 4/027 |
| 11,416,943 | B2 * | 8/2022 | Shalev-Shwartz | B60W 10/20 |
| 11,577,722 | B1 * | 2/2023 | Packer | G05D 1/0088 |
| 11,661,109 | B2 * | 5/2023 | Dalzell | B60Q 1/343 701/41 |
| 11,814,070 | B1 * | 11/2023 | Prioletti | G05B 17/02 |
| 11,835,956 | B2 * | 12/2023 | Matsubara | B60W 30/18163 |
| 11,851,089 | B1 | 12/2023 | Hinojosa et al. | |
| 11,884,294 | B2 * | 1/2024 | Zhang | B60W 50/0097 |
| 12,065,140 | B1 * | 8/2024 | Pronovost | B60W 40/04 |
| 12,134,403 | B2 * | 11/2024 | Wang | B60W 60/0015 |
| 12,291,210 | B2 * | 5/2025 | Münning | B60W 50/10 |
| 12,351,183 | B2 * | 7/2025 | Foil | G01S 13/931 |
| 12,397,828 | B2 * | 8/2025 | Cui | B60W 60/00272 |
| 12,434,710 | B2 * | 10/2025 | Nilsson | B60W 60/0011 |
| 12,448,001 | B2 * | 10/2025 | Bagnell | B60W 50/0097 |
| 2002/0067289 | A1 | 6/2002 | Smith | |
| 2005/0134440 | A1 * | 6/2005 | Breed | G08G 1/161 701/45 |
| 2009/0067675 | A1 * | 3/2009 | Tan | G01S 13/931 382/104 |
| 2010/0256836 | A1 * | 10/2010 | Mudalige | G08G 1/22 701/25 |
| 2011/0118967 | A1 * | 5/2011 | Tsuda | B60W 30/10 701/117 |
| 2012/0046855 | A1 * | 2/2012 | Wey | G08G 1/09623 701/117 |
| 2013/0253797 | A1 * | 9/2013 | Mcnew | B60W 30/143 701/1 |
| 2015/0046078 | A1 * | 2/2015 | Biess | G08G 1/163 701/301 |
| 2015/0151753 | A1 * | 6/2015 | Clarke | B60W 40/076 701/25 |
| 2015/0151756 | A1 * | 6/2015 | Han | B60W 30/18145 701/93 |
| 2016/0027300 | A1 * | 1/2016 | Raamot | G08G 1/0145 340/922 |
| 2016/0129907 | A1 * | 5/2016 | Kim | G06V 20/588 701/26 |
| 2016/0357188 | A1 * | 12/2016 | Ansari | G05D 1/0274 |
| 2016/0357262 | A1 * | 12/2016 | Ansari | G06V 20/59 |
| 2017/0015318 | A1 * | 1/2017 | Scofield | H04M 15/60 |
| 2017/0031017 | A1 * | 2/2017 | Jin | G01S 13/931 |
| 2017/0293299 | A1 * | 10/2017 | Matsushita | B60W 10/04 |
| 2017/0355368 | A1 * | 12/2017 | O'Dea | B60W 30/14 |
| 2018/0037221 | A1 * | 2/2018 | Myers | G08G 1/0145 |
| 2018/0259967 | A1 * | 9/2018 | Frazzoli | B60W 30/0956 |
| 2019/0092329 | A1 * | 3/2019 | Masui | G01S 13/867 |
| 2019/0184990 | A1 * | 6/2019 | Lee | B60W 30/12 |
| 2019/0276017 | A1 * | 9/2019 | Hardy | B60W 30/12 |
| 2019/0329772 | A1 * | 10/2019 | Graves | B60W 30/16 |
| 2019/0377340 | A1 * | 12/2019 | Ahiad | B60K 35/10 |
| 2020/0001867 | A1 * | 1/2020 | Mizutani | G08G 1/166 |
| 2020/0139971 | A1 * | 5/2020 | Bucht | B60W 30/18145 |
| 2020/0209860 | A1 * | 7/2020 | Zhang | G05D 1/0276 |
| 2020/0258380 | A1 * | 8/2020 | Wissing | G08G 1/04 |
| 2021/0009163 | A1 | 1/2021 | Urtasun et al. | |
| 2021/0016799 | A1 * | 1/2021 | Matsushita | B60W 50/14 |
| 2021/0078603 | A1 * | 3/2021 | Nakhaei Sarvedani | G06N 3/0475 |
| 2021/0094577 | A1 * | 4/2021 | Shalev-Shwartz | G05D 1/0231 |
| 2021/0101620 | A1 * | 4/2021 | Buerkle | B60W 10/20 |
| 2021/0129834 | A1 * | 5/2021 | Gier | B60W 30/0956 |
| 2021/0133466 | A1 * | 5/2021 | Gier | G05D 1/0223 |
| 2021/0148724 | A1 * | 5/2021 | Bang | G05D 1/0287 |
| 2021/0165409 | A1 * | 6/2021 | Berntorp | G05D 1/0214 |
| 2021/0271249 | A1 * | 9/2021 | Kobashi | G06V 20/58 |
| 2022/0009492 | A1 * | 1/2022 | Adwan | B60W 40/105 |
| 2022/0163973 | A1 * | 5/2022 | Zhang | B60W 60/0013 |
| 2022/0169278 | A1 * | 6/2022 | Refaat | B60W 60/001 |
| 2022/0177001 | A1 | 6/2022 | Kulkarni et al. | |
| 2022/0204026 | A1 * | 6/2022 | Kim | B60W 30/12 |
| 2022/0227372 | A1 * | 7/2022 | Nilsson | B60W 30/18159 |
| 2022/0274627 | A1 * | 9/2022 | Fairley | G06V 20/56 |
| 2022/0289238 | A1 * | 9/2022 | Wang | B60W 60/0017 |
| 2022/0289248 | A1 * | 9/2022 | Niewiadomski | B60K 35/10 |
| 2022/0309801 | A1 * | 9/2022 | Oi | G06T 7/20 |
| 2022/0314968 | A1 * | 10/2022 | Horita | G01S 17/931 |
| 2022/0324482 | A1 * | 10/2022 | Guo | G06V 20/588 |
| 2022/0355825 | A1 * | 11/2022 | Deo | G06N 3/0464 |
| 2022/0410902 | A1 * | 12/2022 | Münning | B60W 40/105 |
| 2023/0005374 | A1 * | 1/2023 | Elimaleh | G08G 1/065 |
| 2023/0012853 | A1 * | 1/2023 | Tam | B60W 30/0953 |
| 2023/0103248 | A1 * | 3/2023 | Abrash | B60W 10/18 701/26 |
| 2023/0125901 | A1 * | 4/2023 | Kurihashi | B60K 35/10 701/123 |
| 2023/0134068 | A1 * | 5/2023 | Willoughby | B60W 30/0956 701/23 |
| 2023/0150542 | A1 * | 5/2023 | Foster | G01C 21/3885 701/26 |
| 2023/0168095 | A1 * | 6/2023 | Lee | G06N 3/0499 |
| 2023/0322267 | A1 * | 10/2023 | Mei | B60W 30/165 701/26 |
| 2024/0092398 | A1 * | 3/2024 | Caldwell | B60W 10/04 |
| 2024/0174223 | A1 * | 5/2024 | Park | B60W 30/0956 |
| 2024/0182063 | A1 * | 6/2024 | Esna Ashari Esfahani | B60W 30/0956 |
| 2024/0217548 | A1 * | 7/2024 | Pronovost | G06N 20/00 |
| 2024/0217558 | A1 * | 7/2024 | Choudhury | B60W 60/00272 |
| 2024/0419902 | A1 * | 12/2024 | Wu | G06F 40/30 |
| 2025/0002049 | A1 * | 1/2025 | Tam | B60W 60/001 |
| 2025/0042415 | A1 * | 2/2025 | Palmer | B60W 10/18 |
| 2025/0065917 | A1 * | 2/2025 | Cui | B60W 60/00274 |
| 2025/0187598 | A1 * | 6/2025 | Clarke | B60W 30/162 |
| 2025/0214618 | A1 * | 7/2025 | Bagnell | B60W 60/00272 |
| 2025/0289470 | A1 * | 9/2025 | Choi | B60W 50/0097 |
| 2025/0333053 | A1 * | 10/2025 | Oishi | B60W 30/095 |
| 2025/0360926 | A1 * | 11/2025 | Izumi | B60Q 1/507 |

FOREIGN PATENT DOCUMENTS

| | | | | |
|---|---|---|---|---|
| DE | 60016815 | T2 | 1/2006 | |
| DE | 102013016488 | A1 | 4/2015 | |
| DE | 102016003026 | A1 | 9/2016 | |
| DE | 102016211208 | A1 * | 12/2017 | B60W 30/16 |
| DE | 102017112300 | A1 | 12/2017 | |
| DE | 102021206694 | A1 | 12/2022 | |
| DE | 102022124517 | A1 | 7/2023 | |

OTHER PUBLICATIONS

CN-113291308-B machine translation (Year: 2022).*

"Highway Capacity Manual, Chapter 22: Freeway Facilities", Jun. 1999, Transportation Research Board, Washington D.C., USA.

"How Do Weather Events Impact Roads: FHWA Road Weather Management Program", Federal Highway Administration, 2023, U.S. Department of Transportation, Washington D.C., USA.

"PTV VISSIM 11 Manual", 2022, PTV Planung Transport Verkehr AG, Karlsruhe, Germany.

Ahmed, M. et al., "Driver Performance and Behavior in Adverse Weather Conditions: An Investigation Using the SHRP2 Naturalistic Driving Study Data—Phase 2", SHRP2SOLUTIONS, Dec. 2015, U.S. Department of Transportation, USA.

Ahmed, M. et al., "Global lessons learned from naturalistic driving studies to advance traffic safety and operation research: A systematic review", Accident Analysis & Prevention, Mar. 2022, vol. 167, Elsevier, Amsterdam, Netherlands.

Ahmed, M. et al., "Implementation of SHRP2 Results within the Wyoming Connected Vehicle Variable Speed Limit System: Phase

(56) References Cited

OTHER PUBLICATIONS

2 Early Findings Report and Phase 3 Proposal", 2017, Department of Civil and Architectural Engineering, Laramie, WY, USA.

Andreescu, M., et al., "Weather and Traffic Accidents in Montreal", Canada, Climate Research, Feb. 27, 1998, vol. 9: 225-230, Inter-Research, Luhe, Germany.

Andrey, J. et al., "Relationships Between Weather and Road Safety: Past and Future Research Directions", Climatological Bulletin vol. 24, No. 3, 123-137, Jan. 5, 1990, Canadian Meteorological and Oceanographic Society, Ottawa, ON, CA.

Antin, J. et al, "Design of the In-Vehicle Driving Behavior and Crash Risk Study", Virginia Tech Transportation Institute, 2011, National Academy of Sciences, Washington D.C., USA.

Chen, C. et al., "Assessing the Influence of Adverse Weather on Traffic Flow Characteristics Using a Driving Simulator and VIS-SIM", "Sustainability", Dec. 12, 2018, Multidisciplinary Digital Publishing Institute (MDPI), Basel, Switzerland.

Ciuffo, B. et al., "Thirty Years of Gipps' Car-Following Model: Applications, Developments, and New Features", Transportation Research Record Journal of the Transportation Research Board 2315, Dec. 2012, 89-99, SAGE Journals, Thousand Oaks, CA, USA.

Das, A. et al., "Structural Equation Modeling Approach for Investigating Driver Behavior in Adverse Weather Conditions using Trajectory-level SHRP2 Naturalistic Driving Data", Road Safety & Simulation Internation Conference, University of Wyoming Department of Civil and Architectural Engineering, Laramie, WY, USA.

Gao, Y., "Calibration and Comparison of the VISSIM and INTE-GRATION Microscopic Traffic Simulation Models", Virginia Tech Department of Civil and Environmental Engineering, Sep. 5, 2008, Virginia Tech, Blacksburg, VA, USA.

Ghasemzadeh, A. et al., "Utilizing naturalistic driving data for in-depth analysis of driver lane-keeping behavior in rain: Non-parametric MARS and parametric logistic regression modeling approaches", Transportation Research Part C: Emerging Technologies, 2018, 379-392, vol. 90, University of Wyoming, Laramie, WY, USA.

Ghasemzadeh, A., "Driver Speed and Lane Keeping Behaviors in Adverse Weather Conditions: An Investigation Using the Second Strategic Highway Research Program Naturalistic Driving Data", Department of Civil and Architectural Engineering, Dec. 2017, University of Wyoming, Laramie, WY, USA.

Gipps, P., "A Behavioural Car-Following Model for Computer Simulation", Transportation Research Part B: Methodological 15, No. 2 (1981), 105-111, Elsevier Ltd., Amsterdam, Netherlands.

Gipps, P., "A model for the structure of lane-changing decisions", Transportation Research Part B: Methodological, Oct. 1986, pp. 403-414, vol. 20, Issue 5, Elsevier, Amsterdam, Netherlands.

Hammit, B. et al., "Toward the Development of Weather-Dependent Microsimulation Models", Transportation Research Record, Apr. 28, 2019, pp. 143-156, vol. 2673, Issue 7, Transportation Research Board, Washington, D.C., US.

Hosseinlou, M. et al., "A study of the minimum safe stopping distance between vehicles in terms of braking systems, weather and pavement conditions", Indian Journal of Science and Technology, Oct. 2012, 3422-3427, vol. 5, Indian Journal of Science and Technology, India.

Khan, M. et al., "Development of a Novel Convolutional Neural Network Architecture Named RoadweatherNet for Trajectory-Level Weather Detection using SHRP2 Naturalistic Driving Data", Transportation Research Record, Apr. 2, 2021, pp. 1016-1030, vol. 2675, Issue 9, Transportation Research Board, Washington, D.C., US.

Mccann, K. et al., "Investigation of Driver Speed Choice and Crash Characteristics During Low Visibility Events", Virginia Transporation Research Council, No. VTRC 17-R4. Virginia. Dept. of Transportation, 2016.

Pisano, P., et al., "Surface Transportation Weather Applications", Federal Highway Administration in concert with Mitretek Systems, 2002, Institute of Transportation Engineers, USA.

Shabarek, A. et al., "Deep Learning Framework for Freeway Speed Prediction in Adverse Weather", Transportation Research Record, Aug. 27, 2020, vol. 2674, Issue 10, Transportation Research Board, Washington, D.C., US.

Tanner, J.C., "Effect of Weather on Traffic Flow", Nature, Jan. 19, 1952, 107, vol. 169, Issue 4290, Nature Publishing Group, USA.

Winsor, M., "Influence of Connected and Cooperative Vehicles on Virtual Right of Way Performance in Mixed Traffic", Jun. 4, 2020, pp. 1-77, Technical University of Munich, Germany.

Baffet, G., et al. "An Observer of Tire-Road Forces and Friction for Active Security Vehicle Systems," IEEE/ASME Transactions on Mechatronics, vol. 12, No. 6, 2007, pp. 651-663.

\* cited by examiner

PROBABILISTIC DRIVING BEHAVIOR MODELING SYSTEM FOR A VEHICLE

INTRODUCTION

The present disclosure relates to a hybrid probabilistic driving behavior modeling system for a vehicle that accounts for adverse weather conditions.

Autonomous vehicles are becoming more ubiquitous, but still share the roadway with vehicles that are driven manually by individuals. Driver behavior models may be used to predict driving maneuvers, driver intent, and vehicle state. One type of driver behavior model is a microscopic driver behavior model, which includes several sub-models that describe driver behavior. Two examples of the sub-models are a car-following model and a lane-changing model. The car-following model simulates how a driver of a constricted vehicle reacts to variations in the relative location and speed of a leading vehicle in an uninterrupted flow of traffic. The lane-changing model refers to when a vehicle changes from a current lane of travel to an adjacent lane of travel. It is to be appreciated that the car-following model and the lane-changing model are considered in isolation, without determining the effect one model has on the other model. Considering the models in isolation may result in unrealistic behaviors, since speed profiles and lane decisions are selected separately from one another.

Adverse weather conditions such as rain, fog, or snow may reduce the visibility of objects in the environment surrounding the vehicle. Adverse weather conditions may also reduce pavement friction as well as vehicle maneuverability and stability. As a result, a driver may behave differently when operating a vehicle under adverse weather conditions than when he or she operates a vehicle in clear or non-inclement weather conditions. However, current approaches tend to ignore the impact adverse weather conditions have on driver behavior, and usually only consider non-inclement weather conditions.

Thus, while driver behavior models for autonomous vehicles achieve their intended purpose, there is a need in the art for improved driver behavior models that consider adverse weather conditions.

SUMMARY

According to several aspects, a hybrid probabilistic driving behavior modeling system for a vehicle conditioned on weather is disclosed. The hybrid probabilistic driving behavior modeling system includes one or more controllers executing instructions to determine, by a longitudinal driving model stored by the one or more controllers, a probabilistic longitudinal velocity of the vehicle with respect to a current weather condition based on a car-following model, a semantic rule system, and a speed and visibility model, wherein the current weather condition indicates an adverse weather condition impacting driving conditions for the vehicle. A probabilistic lateral driving model of the one or more controllers determines one or more lane choices for the vehicle with respect to the current weather condition based on a route plan of the vehicle and perception data indicative of an environment surrounding the vehicle. The controllers select a final lane choice from the one or more lane choices, where the final lane choice includes a maximum probability of being selected at the probabilistic longitudinal velocity when compared to the remaining lane choices that are part of the one or more lane choices. The controllers determine a next state of the vehicle based on the final lane choice and the probabilistic longitudinal velocity.

In another aspect, the probabilistic longitudinal velocity is determined by the car-following model, a velocity of the vehicle by calculating a first maximum velocity and a second maximum velocity, and selecting a minimum value between the first maximum velocity and the second maximum velocity.

In yet another aspect, the first maximum velocity represents when the vehicle is driven to achieve a target speed and the second maximum velocity represents when the vehicle is driven to preserve a recommended distance from a leading vehicle.

In an aspect, the probabilistic longitudinal velocity is determined by determining, by the semantic rule system, a constrained velocity that limits the velocity of the vehicle determined by the car-following model based on a plurality of high-level rules.

In another aspect, the plurality of high-level rules limit the velocity of the vehicle determined by the car-following model based on one or more driving conditions that are created by a specific adverse weather condition indicated by the current weather condition.

In an aspect, the probabilistic longitudinal velocity is determined by determining, by the speed and visibility model, the probabilistic longitudinal velocity of the vehicle with respect to the current weather condition by limiting the constrained velocity based on a visibility distance.

In another aspect, the speed and visibility model represents a relationship between the constrained velocity and a visibility distance of a driver of the vehicle for a specific locality, where the constrained velocity is negatively correlated with an inverse of the visibility distance.

In yet another aspect, the probabilistic lateral driving model classifies a current road segment that is part of a road plan as including either a necessary lane change or a free lane change.

In an aspect, the current road segment is classified as including the necessary lane change in response to determining a lane change is necessary at the current road segment to reach the next road segment that is part of the route plan.

In another aspect, the current road segment is classified as including a free lane change in response to determining the vehicle is performing one or more of the following: changing lanes to increase a distance between either a leading or trailing vehicle, and to achieve a higher velocity.

In yet another aspect, the one or more controllers store a plurality of joint probability distribution models that indicate a probability that a specific lane choice is selected at a specified longitudinal speed of the vehicle at a specific adverse weather condition.

In an aspect, the joint probability distribution models are determined by defining a set of random variables and set of weather conditions, wherein a first random variable represents longitudinal behavior and second random variable represents lateral behavior.

In another aspect, the adverse weather condition is one of the following: rain, fog, snow, and reduced illumination.

In yet another aspect, a method of determining a next state of a vehicle by a hybrid probabilistic driving behavior modeling system for a vehicle is disclosed. The method includes determining, by a longitudinal driving model stored by one or more controllers, a probabilistic longitudinal velocity of the vehicle with respect to a current weather condition based on a car-following model, a semantic rule system, and a speed and visibility model, where the current weather condition indicates an adverse weather condition impacting driving conditions for the vehicle. The method includes determining, by a probabilistic lateral driving model stored by the one or more controllers, one or more lane choices for the vehicle with respect to the current weather condition based on a route plan of the vehicle and perception data indicative of an environment surrounding the vehicle. The method includes selecting, by the one or more controllers, a final lane choice from the one or more lane choices, where the final lane choice includes a maximum probability of being selected at the probabilistic longitudinal velocity when compared to the remaining lane choices that are part of the one or more lane choices. The method includes determining a next state of the vehicle based on the final lane choice and the probabilistic longitudinal velocity.

In another aspect, the method includes determining, by the car-following model, a velocity of the vehicle by calculating a first maximum velocity and a second maximum velocity, and selecting a minimum value between the first maximum velocity and the second maximum velocity.

In yet another aspect, the method comprises determining, by the semantic rule system, a constrained velocity that limits the velocity of the vehicle determined by the car-following model based on a plurality of high-level rules.

In an aspect, the method includes determining, by the speed and visibility model, the probabilistic longitudinal velocity of the vehicle with respect to the current weather condition by limiting the constrained velocity based on a visibility distance.

In another aspect, the method includes classifying a current road segment that is part of a road plan as including either a necessary lane change or a free lane change.

In yet another aspect, a hybrid probabilistic driving behavior modeling system for a vehicle includes one or more controllers executing instructions to determine, by a longitudinal driving model stored by the one or more controllers, a probabilistic longitudinal velocity of the vehicle with respect to a current weather condition based on a car-following model, a semantic rule system, and a speed and visibility model, where the current weather condition indicates an adverse weather condition impacting driving conditions for the vehicle, and where the probabilistic longitudinal velocity is determined by determining, by the car-following model, a velocity of the vehicle by calculating a first maximum velocity and a second maximum velocity, selecting a minimum value between the first maximum velocity and the second maximum velocity, determining, by the semantic rule system, a constrained velocity that limits the velocity of the vehicle determined by the car-following model based on a plurality of high-level rules, and determining, by the speed and visibility model of the one or more controllers, the probabilistic longitudinal velocity of the vehicle with respect to the current weather condition by limiting the constrained velocity based on a visibility distance. A probabilistic lateral driving model stored by the one or more controllers determines one or more lane choices for the vehicle with respect to the current weather condition based on a route plan of the vehicle and perception data indicative of an environment surrounding the vehicle. The one or more controllers select a final lane choice from the one or more lane choices, where the final lane choice includes a maximum probability of being selected at the probabilistic longitudinal velocity when compared to the remaining lane choices that are part of the one or more lane choices. The one or more controllers determine a next state of the vehicle based on the final lane choice and the probabilistic longitudinal velocity.

In another aspect, the probabilistic lateral driving model classifies a current road segment that is part of a road plan as including either a necessary lane change or a free lane change.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
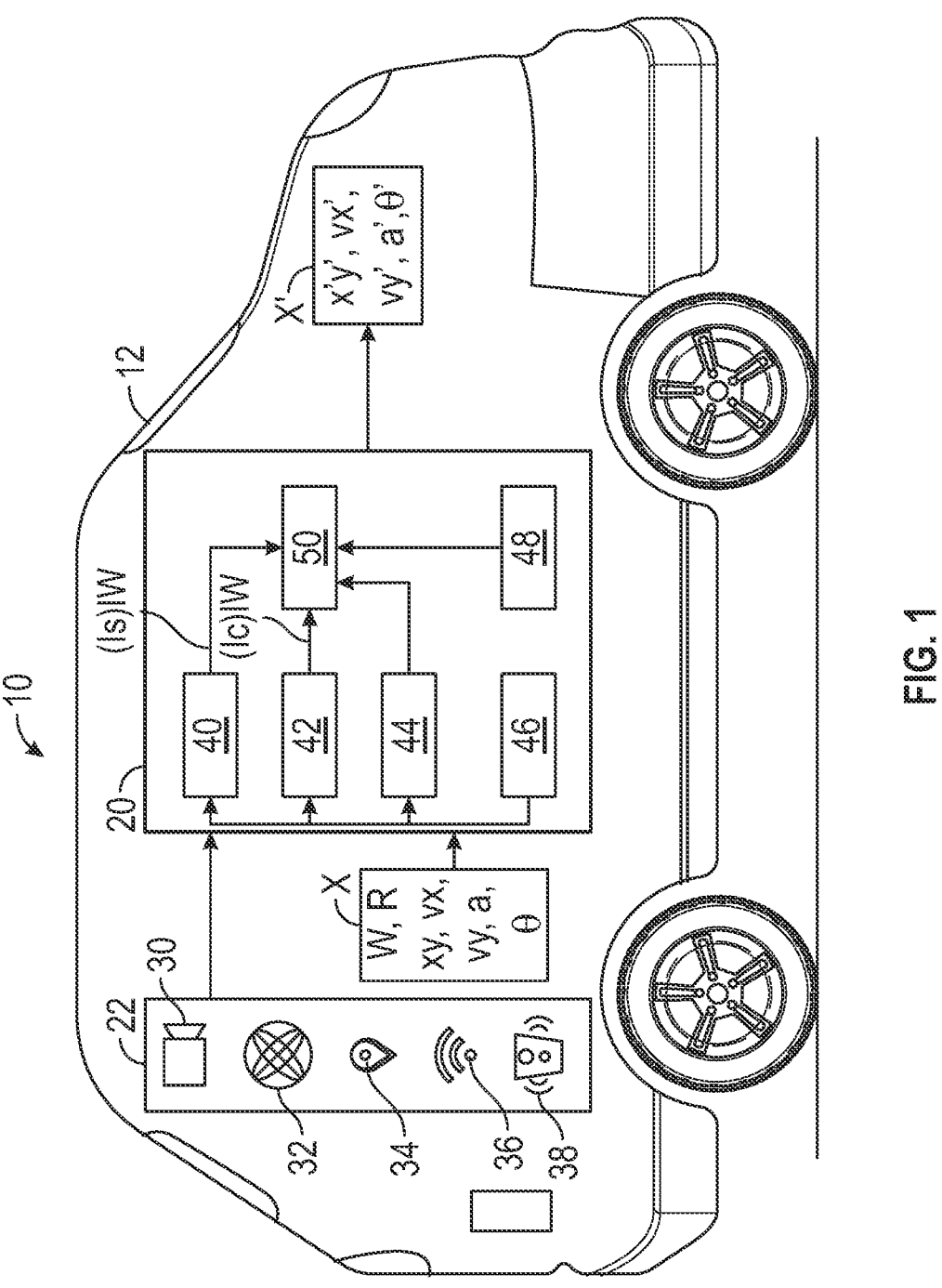
FIG. 1 is a schematic diagram of a vehicle including the disclosed hybrid probabilistic driving behavior modeling system including one or more controllers, according to an exemplary embodiment.

Referring to FIG. 1, an exemplary hybrid probabilistic driving behavior modeling system 10 for a vehicle 12 is illustrated. It is to be appreciated that the vehicle 12 may be any type of vehicle such as, but not limited to, a sedan, truck, sport utility vehicle, van, or motor home. The vehicle 12 includes either an automated driving system (ADS) or an advanced driver assistance system (ADAS) for assisting a driver with steering, braking, and/or accelerating. The hybrid probabilistic driving behavior modeling system 10 includes one or more controllers 20 in electronic communication with a plurality of perception sensors 22 configured to collect perception data indicative of an environment surrounding the vehicle 12. In the non-limiting embodiment as shown in FIG. 1, the plurality of perception sensors 22 include one or more cameras 30, an inertial measurement unit (IMU) 32, a global positioning system (GPS) 34, radar 36, and LiDAR 38, however, is to be appreciated that additional sensors may be used as well.

As seen in FIG. 1, the one or more controllers 20 of the hybrid probabilistic driving behavior modeling system 10 include a longitudinal driving model block 40, a lateral driving model block 42, a semantic driving model block 44, a model correlation module 46, and weather calibration module 48, and a driver behavior module 50. The one or more controllers 20 receive an input state X of the vehicle 12, where the input state X represents a current state of the vehicle 12 observed by the plurality of perception sensors 22 in combination with other sensors (not shown) that are part of the vehicle 12 such as, for example, wheel speed sensors. The input state X of the vehicle 12 includes a current weather conditions W, a current kinematic state of the vehicle 12, and a road condition R.

It is to be appreciated that the current weather condition W indicates an adverse weather condition that impacts driving conditions for the vehicle 12. Some examples of adverse weather conditions include, but are not limited to, rain, fog, snow, and reduced illumination that occurs at dusk or at night. In one specific embodiment, rain and/or fog may be further categorized into different intensities such as, for example, very light rain, light rain, moderate rain, and heavy rain. The adverse weather conditions impact driving conditions by limiting the visibility distance of the driver or by impacting the surface of the roads. For example, the surface of roads may be impacted by rain, which makes the pavement slippery. The road condition R is indicative of a friction coefficient $\mu_{coefficient}$ of the surface of the roadway. The friction coefficient $\mu_{coefficient}$ of the roadway indicates when the roadway is covered by ice or snow, when the roadway is wet due to precipitation, or is dry. The friction coefficient $\mu_{coefficient}$ of the roadway is associated with and is used to determine uncertainty in vehicle position that is created by the adverse weather condition. Specifically, a deviation $\sigma$ of a normal distribution of data samples modeling the vehicle behavior is inversely proportional to the friction coefficient $\mu_{coefficient}$.

The current kinematic state of the vehicle 12 indicates variables such as, but not limited to, a current position x, y of the vehicle 12, current longitudinal velocity vx, current lateral velocity vy, current acceleration a, and a current heading angle $\theta$. The one or more controllers 20 determine a next state X' of the vehicle 12 based on the input state X, where the next state X' of the vehicle 12 indicates the next kinematic state of the vehicle 12 and includes variables such as, but not limited to, the next position x', y' of the vehicle 12, the next longitudinal velocity vx', the next lateral velocity vy', the next acceleration a', and the next heading angle $\theta'$.

Figure 2:
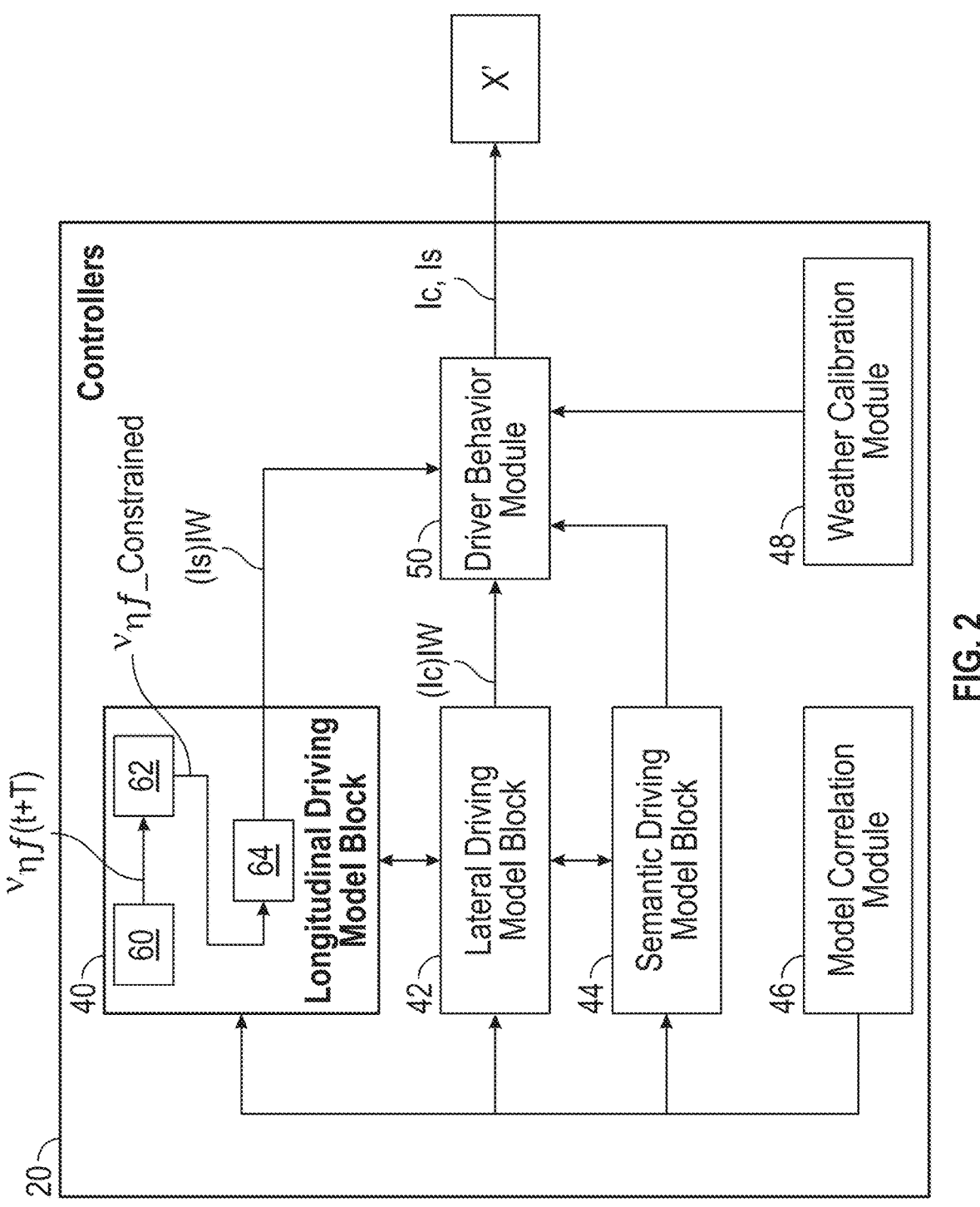
FIG. 2 illustrates the software architecture for the one or more controllers shown in FIG. 1, according to an exemplary embodiment.

FIG. 2 illustrates the software architecture for the one or more controllers 20. The longitudinal driving model block 40 executes a longitudinal driving model that determines a probabilistic longitudinal velocity of the vehicle 12 with respect to the current weather condition W, and is denoted as (Is)|W, where the driver behavior module 50 receives the probabilistic longitudinal velocity (Is)|W as input. The longitudinal driving model includes a car-following model 60, a semantic rule system 62, and a speed and visibility model 64. The lateral driving model block 42 determines one or more lane choices (Ic)|W for the vehicle 12 with respect to the current weather condition W, where the driver behavior module 50 receives the lane change maneuver (Ic)|W as input. The one or more lane choices (Ic)|W for the vehicle 12 include turn right, turn left, or proceed straight.

As explained below, the model correlation module 46 stores a plurality of joint probability distribution models that are employed by the driver behavior module 50. The joint probability distribution models indicate the probability that a specific lane choice is selected at a specified longitudinal speed of the vehicle 12 at a specific adverse weather condition and are determined based on training data. The driver behavior module 50 receives the probabilistic longitudinal velocity (Is)|W and the one or more lane choices (Ic)|W as input and selects a final lane choice from the one or more lane choices (Ic)|W, where the final lane choice includes the maximum probability of being selected at the longitudinal speed (Ic)|W when compared to the remaining lane choices that are part of the one or more lane choices (Ic)|W. The driver behavior module 50 then outputs the final lane choice Ic and the probabilistic longitudinal velocity Is, where the one or more controllers 20 convert the final lane choice Ic and the probabilistic longitudinal velocity Is into the next state X' of the vehicle 12.

Figure 3:
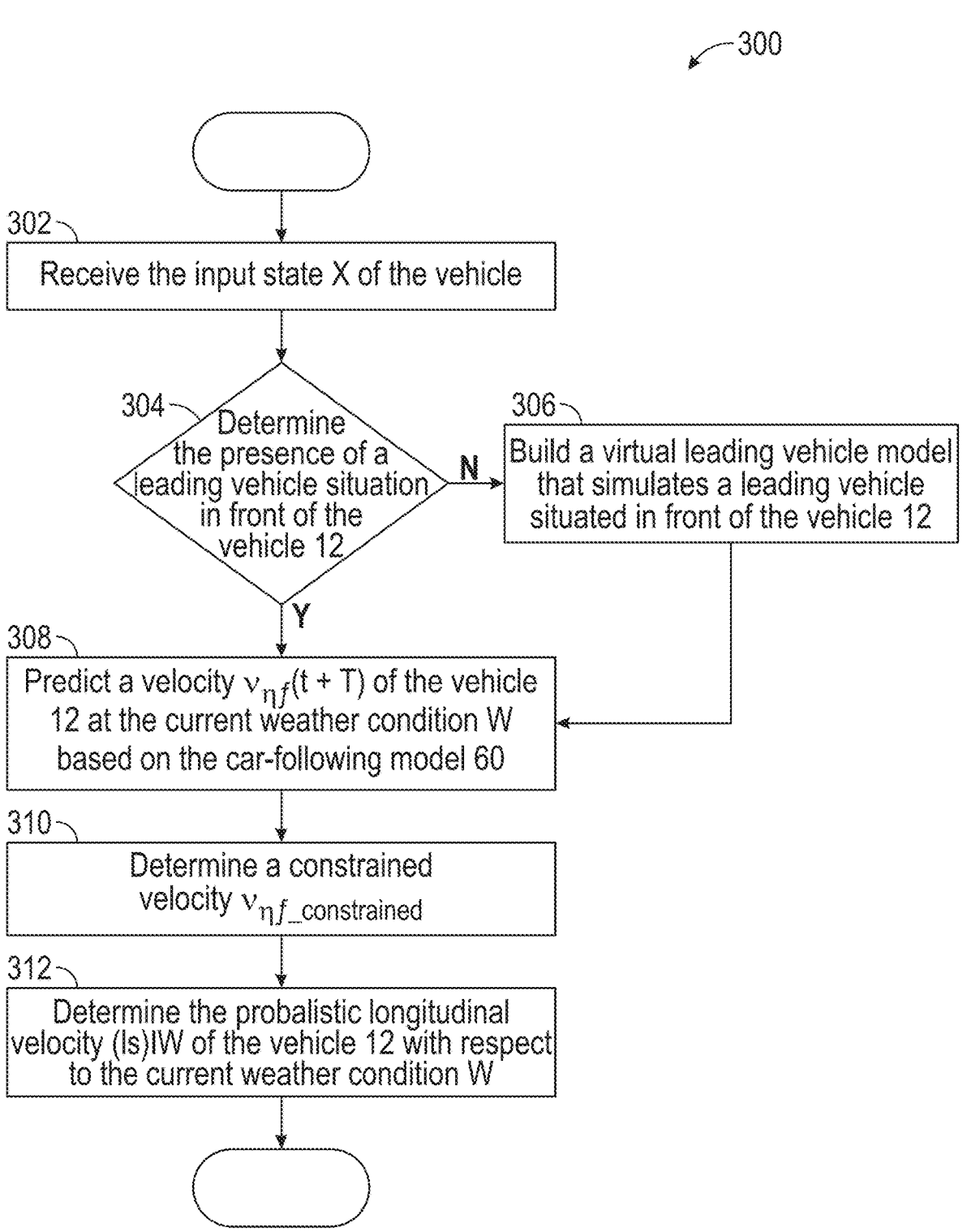
FIG. 3 illustrates a method for determining a probabilistic longitudinal velocity of the vehicle at a current weather condition by a longitudinal driving model block that is part of the one or more controllers shown in FIG. 2, according to an exemplary embodiment.

The longitudinal driving model block 40 of the one or more controllers 20 shall now be described. The longitudinal driving model block 40 executes a longitudinal behavior driving model that determines the probabilistic longitudinal velocity (Is)|W of the vehicle 12 at the current weather condition W based on the car-following model 60, the semantic rule system 62, and the speed and visibility model 64. FIG. 3 is a process flow diagram illustrating an exemplary method 300 for determining a probabilistic longitudinal velocity (Is)|W of the vehicle 12 with respect to the current weather condition W. Referring to both FIGS. 2 and 3, the method 300 may begin at block 302. In block 302, the longitudinal driving model block 40 receives the input state X of the vehicle 12, which indicates the current weather condition W, the current kinematic state of the vehicle 12, and the road condition R. The longitudinal driving model block 40 also receives the perception data collected by the plurality of perception sensors 22 (shown in FIG. 1) as input. The method 300 may then proceed to decision block 304.

In decision block 304, the longitudinal driving model block 40 determines the presence of a leading vehicle situation in front of the vehicle 12. In response to determining no leading vehicle is present, the method 300 proceeds to block 306, otherwise the method 300 proceeds to block 308. In block 306, the longitudinal driving model block 40 builds a virtual leading vehicle model that simulates a leading vehicle situated in front of the vehicle 12. The virtual leading vehicle model includes a standard deviation of lane position (SDLP) value that indicates the impact adverse weather conditions have on the lane-keeping ability of the simulated leading vehicle. The virtual leading vehicle model also indicates the velocity of the leading vehicle as well. The SDLP value is determined based on Equation 1, which is:

$$SPLD = 0.306(\text{Weather}_{coeff}) - 0.168(\text{speed limit})^*(\text{Weather}_{coeff}) \quad \text{Equation 1}$$

where $\text{Weather}_{coeff}$ represents a weather coefficient that signifies the impact an adverse weather condition has on deviation of lane position, where different adverse weather conditions (e.g., rain, snow, or fog) influence lane positions in different ways. The longitudinal driving model block 40 determines the velocity of the leading vehicle based on a speed selection model that accounts for adverse weather conditions. The speed selection model reduces the velocity of the leading vehicle based on the specific type of adverse weather condition. For example, one type of speed selection model reduces the velocity of the leading vehicle between 5 to 40 percent for snow, 3 to 13 percent for light rain, and 3 to 16 percent for heavy rain based on data from the Federal Highway Administration (FHWA), however, it is to be appreciated that other sources of data may be used as well. The method 300 may then proceed to block 308.

In block 308, the longitudinal driving model block 40 predicts a velocity $v_{nf}$(t+T) of the vehicle 12 at the current weather condition W based on the car-following model 60, where the current weather condition W is an adverse weather condition. Predicting the velocity $v_{nf}$(t+T) of the vehicle 12 at the current weather condition W is described below. The method 300 may then proceed to block 310.

In block 310, the semantic rule system 62 of the longitudinal driving model block 40 determines a constrained velocity $v_{nf\_constrained}$ that limits the velocity $v_{nf}$(t+T) of the vehicle 12 determined by the car-following model 60 based on a plurality of high-level rules that are described below. The plurality of high-level rules limit the velocity $v_{nf}$(t+T) of the vehicle 12 determined by the car-following model 60 based on one or more driving conditions that are created by the adverse weather condition indicated by the current weather condition W. The method 300 may then proceed to block 312.

In block 312, the speed and visibility model 64 of the longitudinal driving model block 40 determines the probabilistic longitudinal velocity (Is)|W of the vehicle 12 with respect to the current weather condition W by limiting the constrained velocity $v_{nf\_constrained}$ based on the visibility distance. Specifically, the speed and visibility model 64 represents a relationship between the constrained velocity $v_{nf\_constrained}$ and the visibility distance of a driver of the vehicle 12 for a specific locality, where the constrained velocity $v_{nf\_constrained}$ is negatively correlated with an inverse of the visibility distance. The speed and visibility model 64 is described in greater detail below. Once the probabilistic longitudinal velocity (Is)|W of the vehicle 12 with respect to the current weather condition W is determined, the method 300 may then terminate.

The car-following model 60 shall now be described. The car-following model 60 is determined based on training data that models the adverse weather conditions. It is to be appreciated that the training data may include real-world data or simulated data. In one exemplary embodiment, the car-following model is the Gipps car-following model and the training data is the Wyoming Second Strategic Highway Research Program's (SHRP2) Naturalistic Driving Study (NDS) dataset, however, it is to be appreciated that other models and datasets may be used as well.

The velocity $v_{nf}$(t+T) is measured at a time interval (t+T), where t represents the current time and T represents an apparent reaction time that is constant among all vehicles in the environment (i.e., the vehicle 12, a lead. The car-following model 60 determines the velocity $v_{nf}$(t+T) of the vehicle 12 by calculating a first maximum velocity $v_{nf}^a$ and a second maximum velocity $v_{nf}^b$, and then selecting the minimum value between the first maximum velocity $v_{nf}^a$ and the second maximum velocity $v_{nf}^b$, which is expressed in Equation 2 as:

$$v_{nf}(t + T) = \min\{v_{nf}^a(t + T),\, v_{nf}^b(t + T)\} \qquad \text{Equation 2}$$

where the first maximum velocity $v_{nf}^a$ represents when the vehicle 12 is driven achieve a target speed and the second maximum velocity $v_{nf}^b$ represents when the vehicle 12 is driven to preserve a recommended distance from a leading vehicle The first maximum velocity $v_{nf}^a$ is solved based on Equation 3 and the second maximum velocity $vnf^b$ is solved based on Equation 4:

$$v_{nf}^a(t + T) = v_n f(t) + 2.5 \times a_{nf}^{max} \times T \times \qquad \text{Equation 3}$$

$$\left(1 - \frac{v_{nf}(t)}{v_{nf}^{desired}}\right) \times \sqrt{0.025 + \frac{v_{nf}(t)}{v_{nf}^{desired}}}$$

$$v_{nf}^b(t + T) = d_{nf}^{max} \times T + \qquad \text{Equation 4}$$

$$\sqrt{\left(d_{nf}^{max} \times T\right)^2 - d_{nf}^{max} \times [2 \times \{x_{nl}(t) - x_{nf}(t) - (s)\} - v_{nf}(t) \times T - \frac{v_{nl}(t)^2}{\hat{d}_{nl}^{max}}]}$$

where f is a subscript indicating a following vehicle (which is the vehicle 12), l is a subscript indicating a leading vehicle, $x_n$ indicates a location of either the leading or following vehicle at time t, un represents the speed of either the leading or following vehicle at time t, $a_n^{max}$ indicates a maximum desired acceleration for vehicle n, $v_n^{desired}$ indicates a maximum desired speed for a vehicle n (where the vehicle n represents either the leading vehicle or the following vehicle), $d_n^{max}$ indicates a maximum desired deceleration for the vehicle n based on the most severe braking that a driver of the following vehicle undertakes, $\hat{d}_{nl}^{max}$ represents an estimation of a maximum deceleration desired by leading to vehicle n and represents an estimate of the leader vehicle's most severe braking capabilities, L represents the leader vehicle length, S represents the intervehicle spacing at a stop or a minimum following distance at a stop, and s=(L₁+S) and represents a sum of the leading vehicle size and the minimum following distance at a stop. The Gipps parameters values expressed in Equations 3 and 4 (e.g., $d_{nf}^{max}$, T, S) are stored by the weather calibration module 48 of the one or more controllers 20. For example, the Gipps parameter value for the intervehicle spacing s is about 2.9 meters during non-inclement weather conditions, 4.4 meters during fog, and 3.1 meters during very light rain, and 3.5 meters during snow.

The semantic rule system 62 of the longitudinal driving model block 40 is now described. It is to be appreciated that the semantic driving model block 44 provides the plurality of high-level rules for the semantic rule system 62 of the longitudinal driving model block 40. The plurality of high-level rules of the semantic rule system 62 limit the velocity $v_{nf}$(t+T) of the vehicle 12 determined by the car-following model 60 based on one or more driving conditions that are created by a specific adverse weather condition indicated by the current weather condition W. In one embodiment, the driving conditions include one or more of the following: pavement conditions, the visibility distance, road geometry, and construction zones. The pavement conditions indicate when the coefficient of friction is changed by precipitation that collects on the roadway. It is to be appreciated that ice or snow may require the vehicle 12 to reduce speed, and therefore the plurality of high-level rules limit the velocity $v_{nf}$(t+T) of the vehicle 12 accordingly. For example, if the pavement is dry, then the plurality of high-level rules indicate the vehicle 12 is to travel at the current speed, with a probability value of 0.95. However, if the pavement is icy and the current velocity of the vehicle 12 is less than a threshold, the vehicle 12 is to reduce speed by eighty percent, with a probability value of 0.9. The road geometry indicates curves in the road and when the vehicle 12 approaches either an entrance ramp or an exit ramp. The plurality of high-level rules indicate when the vehicle 12 enters a work zone and when the visibility distance is normal, the vehicle velocity is reduced by forty percent, however, during low visibility the vehicle velocity is reduced by seventy percent.

The speed and visibility model 64 of the longitudinal driving model block 40 of the one or more controllers 20 is now described. The speed and visibility model 64 determines the probabilistic longitudinal velocity (Is)|W of the vehicle 12 with respect to the current weather condition W by limiting the constrained velocity $v_{nf\_constrained}$ based on the visibility distance. As mentioned above, the speed and visibility model 64 represents a relationship between the constrained velocity $v_{nf\_constrained}$ and the visibility distance of the driver of the vehicle 12 for the specific locality, where the constrained velocity $v_{nf\_constrained}$ is negatively correlated with an inverse of the visibility distance. In other words, the speed and visibility model 64 accounts for how drivers react and constrict the speed of the vehicle 12 when visibility distance is reduced. The specific locality refers to a particular section of roadway. For example, the specific locality may refer to a section of a highway between a first milepost and a second milepost. It is to be appreciated that a specific locality includes various site-specific variables that cannot be transferred directly to another location, however, the speed and visibility model 64 for a specific geographical region may be used to set a constraint in velocity based on the visibility distance. One example of the speed and visibility model 64 representing a segment of a highway measured between two mileposts is expressed in Equation 5 as:

$$S = 64.6 - \frac{4204}{Vis} + (1.13 \times DayNight) + 6.07 \times SB6 - 2.67 \times SB7 \qquad \text{Equation 5}$$

where S represents a mean speed per 5 minutes, Vis represents the visibility distance, DayNight represents a day or night dummy variable with 1 indicating day and 0 indicating night, SB6 represents a variable, with 1 indicating a first milepost on the highway, SB7 represents another variable, with 1 indicating a second milepost on the highway. In the event the the probabilistic longitudinal velocity (Is)|W of the vehicle 12 with respect to the current weather condition W is less than the mean speed S, then the probabilistic longitudinal velocity (Is)|W of the vehicle 12 then the mean speed S is set to the the probabilistic longitudinal velocity (Is)|W (S=Is), otherwise, the the probabilistic longitudinal velocity (Is)|W is limited to the mean speed S.

The lateral driving model block 42 of the one or more controllers 20 shall now be described. The lateral driving model block 42 determines one or more lane choices (Ic)|W for the vehicle 12 with respect to the current weather condition W based on a route plan of the vehicle 12 and the perception data indicative of an environment surrounding the vehicle 12 from the plurality of perception sensors 22 (shown in FIG. 1) based on a probabilistic lateral driving model. The probabilistic lateral driving model is a lane-changing model that determines the lane choices as a vehicle changes lanes from a current lane of travel to an adjacent lane of travel. The route plan for the vehicle 12 includes a plurality of road segments, where the one or more lane choices (Ic)|W for the vehicle 12 are determined for each road segment that is part of the route plan.

Figure 4:
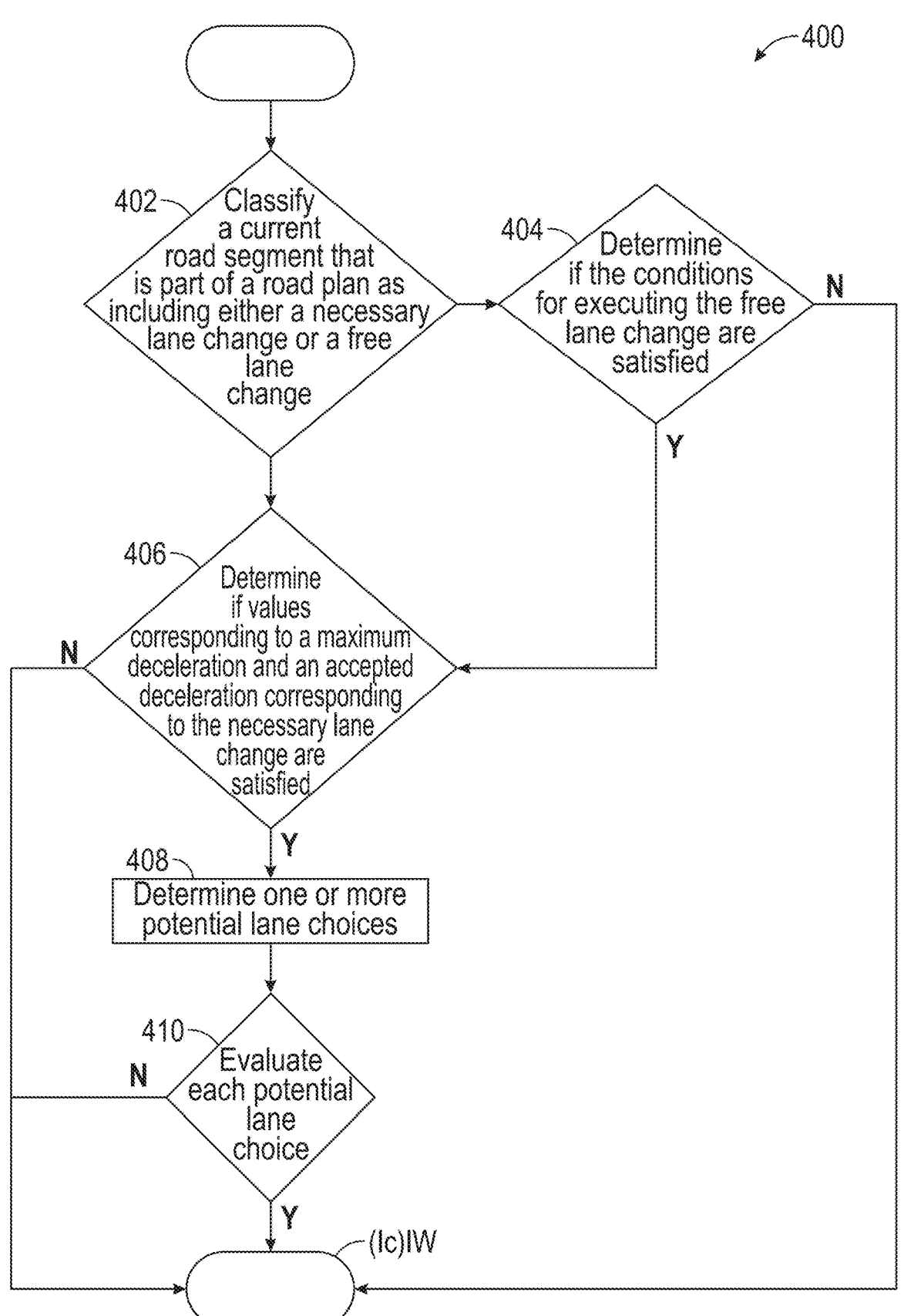
FIG. 4 illustrates a method for determining one or more lane choices at the longitudinal speed by a lateral driving model block that is part of the one or more controllers shown in FIG. 2, according to an exemplary embodiment.

A method 400 for determining the one or more lane choices (Ic)|W for the vehicle 12 is shown in FIG. 4.

Referring to FIGS. 2 and 4, the method 400 begins at decision block 402. In block 402, the lateral driving model block 42 of the one or more controllers 20 classifies a current road segment that is part of a road plan as including either a necessary lane change or a free lane change. The current road segment is classified as including the necessary lane change in response to determining a lane change is necessary at the current road segment to reach the next road segment that is part of the route plan. The current road segment is classified as including a free lane change in response to determining the vehicle 12 is performing one or more of the following: changing lanes to increase a distance between either a leading or trailing vehicle, and to achieve a higher velocity. The necessary lane change and the free lane change are described in greater detail below. In response to classifying the current road segment as including a free lane change, the method 400 may proceed to decision block 404.

In decision block 404, the lateral driving model block 42 determines if the conditions for executing the free lane change are satisfied. Specifically, the conditions for executing the free lane change include determining if an absolute braking distance between the vehicle 12 and a following vehicle allow for the vehicle 12 to come to a complete stop and if a sufficient distance in the direction of travel exists between the vehicle 12 and a following vehicle. The sufficient distance is based on the speed of the vehicle 12 and the speed of the following vehicle. It is to be appreciated that the absolute braking distance and the sufficient distance are calculated based on weather-adjusted parameters that are stored by the weather calibration module 48 of the one or more controllers 20. In response to determining the conditions for executing the free lane change are not satisfied, the method 400 may terminate and a next road segment is considered. However, in response to determining the conditions for executing the free lane change are satisfied, the method 400 proceeds to decision block 406.

In decision block 406, the lateral driving model block 42 of the one or more controllers 20 determines if values corresponding to a maximum deceleration and an accepted deceleration corresponding to the necessary lane change are satisfied. The maximum deceleration refers to an upper bound of a rate of deceleration for the vehicle 12 as well as a trailing vehicle, and the accepted deceleration refers to a lower bound of the deceleration for the vehicle 12 as well as the trailing vehicle. The values for the maximum deceleration and an accepted deceleration are adjusted to account for adverse weather conditions and are stored in the weather calibration module 48 (shown in FIG. 2). In response to determining the maximum deceleration and the accepted deceleration corresponding to the necessary lane change are not satisfied, the method 400 terminates and the next road segment is considered. However, in response to determining the maximum deceleration and the accepted deceleration corresponding to the necessary lane change are not satisfied, the method 400 proceeds to block 408.

In block 408, the lateral driving model block 42 of the one or more controllers 20 determines one or more potential lane choices based on the route plan and the perception data collected by the plurality of perception sensors 22 shown in FIG. 1. The method 400 may then proceed to decision block 410.

In decision block 410, the lateral driving model block 42 of the one or more controllers 20 evaluate each potential lane choice based on a first headway distance threshold measured between the vehicle 12 and a following vehicle in a target lane, a second headway threshold measured between the vehicle 12 and a trailing vehicle in the target lane, and a third headway threshold distance measured between the vehicle 12 and a following vehicle located in the present lane. The first, second, and third headway distance thresholds are selected to ensure that the vehicle 12 has adequate room to travel while switching lanes.

In response to determining a specific lane choice does not comply with the first headway distance threshold, the second headway distance threshold, or the third headway distance threshold, the method 400 terminates, and the specific lane choice is removed from consideration. However, in response to determining a specific lane choice complies with each of the first headway distance threshold, the second headway distance threshold, or the third headway distance threshold, the specific lane choice is added to the one or more lane choices (Ic)|W for the vehicle 12. Once all the specific lane choices have been considered, the lateral driving model block 42 of the one or more controllers 20 transmits the one or more lane choices (Ic)|W for the vehicle 12 to the driver behavior module 50 and the method 400 terminates.

In one non-limiting embodiment, the lane-changing model is simulated by a traffic simulation program such as VISSIM. The necessary lane change is defined by three parameters, the maximum deceleration, the accepted deceleration, and a reduction rate of acceleration. As mentioned above, the maximum deceleration refers to an upper bound of a rate of deceleration for the vehicle 12 as well as a trailing vehicle, and the accepted deceleration refers to a lower bound of the deceleration for the vehicle 12 as well as the trailing vehicle. The reduced rate of acceleration linearly decreases the maximum deceleration with increasing distance from an emergency stop position. Some examples of a necessary lane change include, but are not limited to, an entrance ramp and an exit ramp.

The free lane change is defined by three parameters, minimum headway, distance reduction factor, and maximum deceleration for cooperative braking. The minimum headway represents a minimum distance between the vehicle 12 and either a trailing vehicle or a leading vehicle that is required after a lane change is executed. During a lane change, a value of the minimum distance is reduced by the distance reduction factor. The maximum deceleration for cooperative braking refers to cooperative deceleration of the trailing vehicle that allows for the vehicle 12 to change lanes. Some examples of the free lane change include, but are not limited to, overtaking or passing a slow vehicle in the current lane of travel, returning to a lane preferred by a driver, and entering a new lane. It is to be appreciated that the parameters for both the necessary lane change and the free lane change are adjusted to account for adverse weather conditions and are stored in the weather calibration module 48 (shown in FIG. 2). For example, the maximum deceleration corresponding to the vehicle 12 is $-11.38$ meters/second$^2$ (m/s$^2$) during non-inclement weather, $-8.32$ m/s$^2$ during rain, $-17.84$ m/s$^2$ during snow, and $-17.43$ m/s$^2$ during fog.

The driver behavior module 50 of the one or more controllers 20 shall now be described. As mentioned above, the model correlation module 46 stores a plurality of joint probability distribution models that indicate the probability that a specific lane choice is selected at a specified longitudinal speed of the vehicle 12 at a specific adverse weather condition. The joint probability distribution models are determined by defining a set of random variables {Lo, La} and a set of weather conditions as {W}, where the first random variable Lo represents longitudinal behavior and a second random variable La represents lateral behavior. A joint probability distribution over the set of random variables {Lo, La} conditioned on the set of weather conditions as {W} is defined as P (Lo, La|W). During training, a set of longitudinal probability distributions P (Lo|W) and a set of lateral probability distributions P (La|Lo,W) are defined. The joint probability distribution P (S, Lo, La|W) also considers semantic behavior S as well, where the joint probability distribution P (S, Lo, La|W) is expressed in Equation 6 as:

$$P(S, Lo, La \mid W) = \qquad \text{Equation 6}$$
$$P(S \mid Lo, La \ W)^* P(S, La \mid Lo, W)^* P(Lo \mid W)$$

The driver behavior module 50 selects a lateral behavior la that maximizes longitudinal behavior random variable Lo and the lateral behavior random variable La based on the current weather condition W, which is expressed in Equation 7 as:

$$la = \qquad \text{Equation 7}$$
$$\underset{la \in La}{\operatorname{argmaxlog}} p(La, Lo \mid W) = \underset{la \in La}{\operatorname{argmaxlog}} p(La \mid Lo, W) * p(Lo \mid W)$$

where p (La, Lo|W) represents a conditional probability of the lateral behavior random variable La given the longitudinal behavior random variable Lo and the current weather condition W and p (Lo|W) represents a conditional probability of the longitudinal behavior random variable Lo given the current weather condition W. The driver behavior module 50 selects the final lane choice Ic from the one or more lane choices (Ic)|W received from the lateral behavior block 42 that yields the maximum probability when compared to the remaining lane choices that are part of the one or more lane choices (Ic)|W, and is expressed in Equation 8 as:

$$Ic = \underset{Ic \in Lc}{\operatorname{argmaxlog}} p(Lc \mid Ls, W) * p(Ls \mid W) \qquad \text{Equation 8}$$

The driver behavior module 50 receives the probabilistic longitudinal velocity (Is)|W and the one or more lane choices (Ic)|W as input and selects a final lane choice from the one or more lane choices (Ic)|W based on the joint probability distributions, where the final lane choice includes the maximum probability when compared to the remaining lane choices that are part of the one or more lane choices (Ic)|W. The driver behavior module 50 then outputs the final lane choice Ic and the probabilistic longitudinal velocity Is, where the one or more controllers 20 determine the next state X' of the vehicle 12 based on the final lane choice Ic and the probabilistic longitudinal velocity Is.

Figure 5:
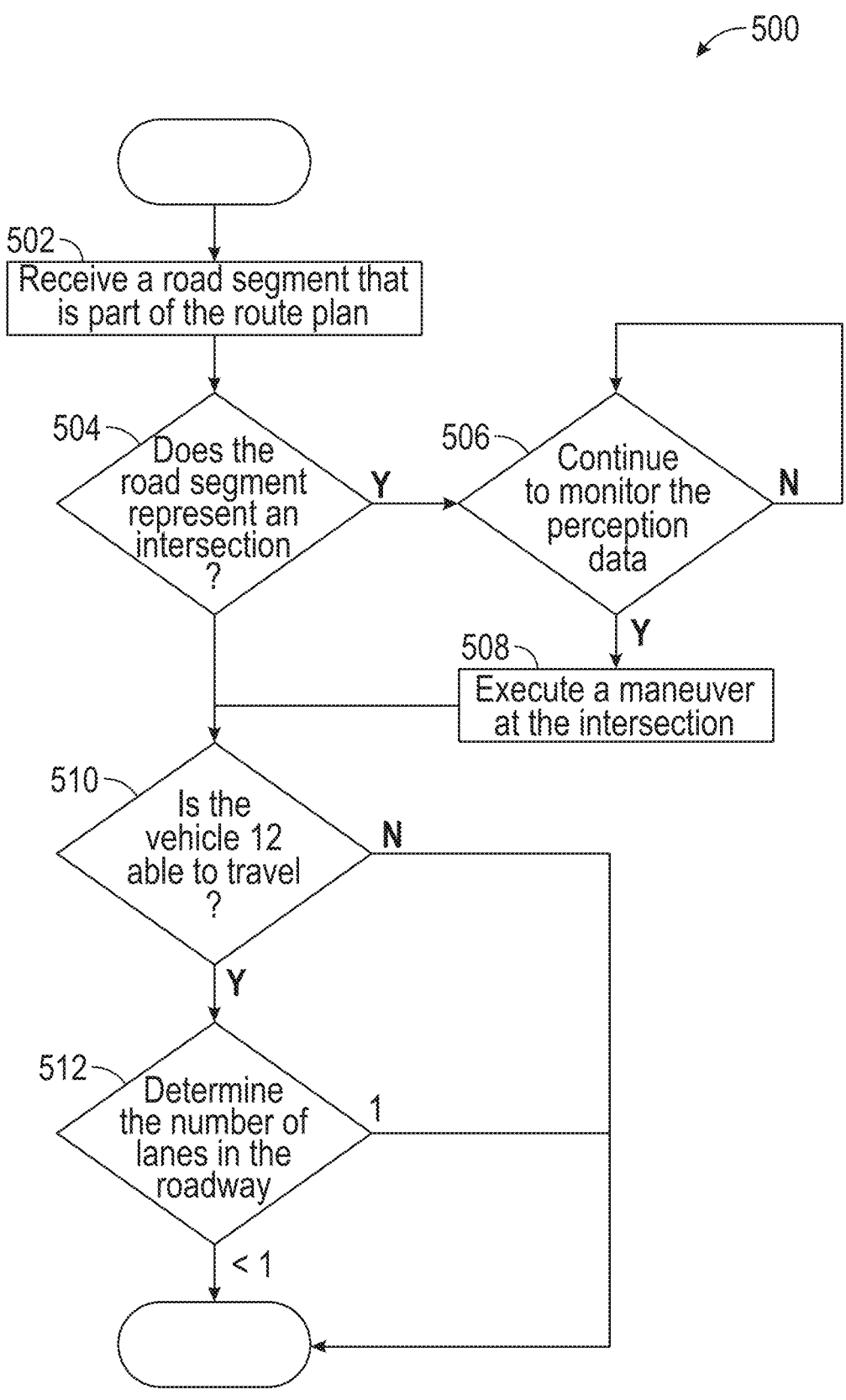
FIG. 5 is a process flow diagram illustrating a method for modeling the behavior of the hybrid probabilistic driving behavior modeling system shown in FIG. 1, according to an exemplary embodiment.

FIG. 5 illustrates a process flow diagram illustrating an exemplary method 500 for modeling the behavior of the hybrid probabilistic driving behavior modeling system 10 shown in FIG. 2. Referring to FIGS. 1, 2, and 5, the method 500 may begin at block 502. In block 502, the one or more controllers 20 receive a road segment that is part of the route plan. The method 500 may then proceed to decision block 504.

In decision block 504, if the road segment represents an intersection, the method proceeds to decision block 506. Otherwise, the method 500 proceeds to decision block 510.

In decision block 506, the one or more controllers 20 continue to monitor the perception data collected by the plurality of perception sensors 22 to determine if the vehicle 12 may execute a maneuver at the intersection. For example, the one or more controllers 20 may wait for a traffic signal to indicate the vehicle 12 may execute a maneuver. Once the one or more controllers 20 determine the vehicle 12 is able to turn, the method 500 proceeds to block 508.

In block 508, the vehicle 12 executes a maneuver at the intersection, where the maneuver is selected from one of the following, turn left, turn right, or proceed straight. The method 500 may then proceed to decision block 510 to evaluate the next road segment.

In decision block 510, the one or more controllers 20 determine if the vehicle 12 is able to travel. If the vehicle 12 is able to travel, the method 500 proceeds to decision block 512. In decision block 512, the one or more controllers 20 determine if the vehicle is presently traveling. If the vehicle 12 is not presently traveling, the one or more controllers 20 select a braking longitudinal model, and the method terminates. The braking longitudinal model utilizes the same longitudinal driving model as the longitudinal driving model block 40 during normal operation of the vehicle 12 to determining a reduced target speed that is required when the vehicle 12 brakes and reduces speed. However, if the vehicle is not traveling, the method 500 returns to decision block 510. Referring to decision block 510, if the one or more controllers 20 determine the vehicle 12 is able to travel, the method 500 proceeds to decision block 512.

In decision block 512, the one or more controllers 20 determine the number of lanes in the roadway. In response to determining only one lane exists in the roadway, the one or more controllers 20 select the lateral driving model block 42 to determine the one or more lane choices (Ic)|W for the vehicle 12. The method 500 may then terminate. In response to determining more than one lane exists in the roadway, the one or more controllers 20 select the longitudinal driving model block 40 to determine the probabilistic longitudinal velocity (Is)|W. The method 500 may then terminate.

Referring generally to the figures, the disclosed hybrid probabilistic driving behavior modeling system provides various technical effects and benefits. Specifically, the hybrid probabilistic driving behavior modeling system integrates a car following model, a lane-changing model, the semantic behavior of a driver, and speed and visibility models to determine the next state of the vehicle during adverse weather conditions, which addresses the occurrence of determining inconsistent behaviors by the models when the models are considered independently from one another. The hybrid probabilistic driving behavior modeling system maximizes the number of lane choices that are available for a vehicle at a specific road segment of a route plan at a specific longitudinal speed at the current weather condition.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid probabilistic driving behavior modeling system for a vehicle conditioned on weather, the hybrid probabilistic driving behavior modeling system comprising:

one or more controllers executing instructions to:

determine, by a longitudinal driving model stored by the one or more controllers, a probabilistic longitudinal velocity of the vehicle with respect to a current weather condition based on a car-following model, a semantic rule system, and a speed and visibility model, wherein the current weather condition indicates an adverse weather condition impacting driving conditions for the vehicle;

determine, by a probabilistic lateral driving model by the one or more controllers, one or more lane choices for the vehicle with respect to the current weather condition based on a route plan of the vehicle and perception data indicative of an environment surrounding the vehicle;

select a final lane choice from the one or more lane choices, wherein the final lane choice includes a maximum probability of being selected at the probabilistic longitudinal velocity when compared to remaining lane choices that are part of the one or more lane choices;

determine a next state of the vehicle based on the final lane choice and the probabilistic longitudinal velocity;

receive a road segment that is part of the route plan, wherein the road segment includes an intersection;

determine the vehicle is able to execute a maneuver at the intersection based on the perception data; and in response to determining the vehicle is able to execute the maneuver, instruct the vehicle to execute the maneuver by assisting with steering, braking, and accelerating.

2. The hybrid probabilistic driving behavior modeling system of claim 1, wherein the probabilistic longitudinal velocity is determined by:

determining, by the car-following model, a velocity of the vehicle by calculating a first maximum velocity and a second maximum velocity; and selecting a minimum value between the first maximum velocity and the second maximum velocity.

3. The hybrid probabilistic driving behavior modeling system of claim 2, wherein the first maximum velocity represents when the vehicle is driven to achieve a target speed and the second maximum velocity represents when the vehicle is driven to preserve a recommended distance from a leading vehicle.

4. The hybrid probabilistic driving behavior modeling system of claim 2, wherein the probabilistic longitudinal velocity is determined by:

determining, by the semantic rule system, a constrained velocity that limits the velocity of the vehicle determined by the car-following model based on a plurality of high-level rules.

5. The hybrid probabilistic driving behavior modeling system of claim 4, wherein the plurality of high-level rules limit the velocity of the vehicle determined by the car-following model based on one or more driving conditions that are created by a specific adverse weather condition indicated by the current weather condition.

6. The hybrid probabilistic driving behavior modeling system of claim 5, wherein the speed and visibility model represents a relationship between the constrained velocity and a visibility distance of a driver of the vehicle for a specific locality, wherein the constrained velocity is negatively correlated with an inverse of the visibility distance.

7. The hybrid probabilistic driving behavior modeling system of claim 4, wherein the probabilistic longitudinal velocity is determined by:

determining, by the speed and visibility model, the probabilistic longitudinal velocity of the vehicle with respect to the current weather condition by limiting the constrained velocity based on a visibility distance.

8. The hybrid probabilistic driving behavior modeling system of claim 1, wherein the probabilistic lateral driving model classifies a current road segment that is part of a road plan as including either a necessary lane change or a free lane change.

9. The hybrid probabilistic driving behavior modeling system of claim 8, wherein the current road segment is classified as including the necessary lane change in response to determining a lane change is necessary at the current road segment to reach the next road segment that is part of the route plan.

10. The hybrid probabilistic driving behavior modeling system of claim 8, wherein the current road segment is classified as including a free lane change in response to determining the vehicle is performing one or more of the following: changing lanes to increase a distance between either a leading or trailing vehicle, and to achieve a higher velocity.

11. The hybrid probabilistic driving behavior modeling system of claim 1, wherein the one or more controllers store a plurality of joint probability distribution models that indicate a probability that a specific lane choice is selected at a specified longitudinal speed of the vehicle at a specific adverse weather condition.

12. The hybrid probabilistic driving behavior modeling system of claim 11, wherein the joint probability distribution models are determined by defining a set of random variables and set of weather conditions, wherein a first random variable represents longitudinal behavior and second random variable represents lateral behavior.

13. The hybrid probabilistic driving behavior modeling system of claim 1, wherein the adverse weather condition is one of the following: rain, fog, snow, and reduced illumination.

14. A method of determining a next state of a vehicle by a hybrid probabilistic driving behavior modeling system for a vehicle, the method comprising:

determining, by a longitudinal driving model stored by one or more controllers, a probabilistic longitudinal velocity of the vehicle with respect to a current weather condition based on a car-following model, a semantic rule system, and a speed and visibility model, wherein the current weather condition indicates an adverse weather condition impacting driving conditions for the vehicle;

determining, by a probabilistic lateral driving model stored by the one or more controllers, one or more lane choices for the vehicle with respect to the current weather condition based on a route plan of the vehicle and perception data indicative of an environment surrounding the vehicle;

selecting, by the one or more controllers, a final lane choice from the one or more lane choices, wherein the final lane choice includes a maximum probability of being selected at the probabilistic longitudinal velocity when compared to remaining lane choices that are part of the one or more lane choices;

determining a next state of the vehicle based on the final lane choice and the probabilistic longitudinal velocity;

receiving a road segment that is part of the route plan, wherein the road segment includes an intersection;

determining the vehicle is able to execute a maneuver at the intersection based on the perception data; and in response to determining the vehicle is able to execute the maneuver, instructing the vehicle to execute the maneuver by assisting with steering, braking, and accelerating.

15. The method of claim 14, wherein the method comprises:

determining, by the car-following model, a velocity of the vehicle by calculating a first maximum velocity and a second maximum velocity; and selecting a minimum value between the first maximum velocity and the second maximum velocity.

16. The method of claim 15, wherein the method comprises:

determining, by the semantic rule system, a constrained velocity that limits the velocity of the vehicle determined by the car-following model based on a plurality of high-level rules.

17. The method of claim 16, wherein the method comprises:

determining, by the speed and visibility model, the probabilistic longitudinal velocity of the vehicle with respect to the current weather condition by limiting the constrained velocity based on a visibility distance.

18. The method of claim 14, wherein the method comprises:

classifying a current road segment that is part of a road plan as including either a necessary lane change or a free lane change.

19. A hybrid probabilistic driving behavior modeling system for a vehicle, the hybrid probabilistic driving behavior modeling system comprising:

one or more controllers executing instructions to:

determine, by a longitudinal driving model stored by the one or more controllers, a probabilistic longitudinal velocity of the vehicle with respect to a current weather condition based on a car-following model, a semantic rule system, and a speed and visibility model, wherein the current weather condition indicates an adverse weather condition impacting driving conditions for the vehicle, and wherein the probabilistic longitudinal velocity is determined by:

determining, by the car-following model, a velocity of the vehicle by calculating a first maximum velocity and a second maximum velocity;

selecting a minimum value between the first maximum velocity and the second maximum velocity;

determining, by the semantic rule system, a constrained velocity that limits the velocity of the vehicle determined by the car-following model based on a plurality of high-level rules, wherein the plurality of high-level rules limit the velocity of the vehicle determined by the car-following model based on one or more driving conditions that are created by a specific adverse weather condition indicated by the current weather condition; and determining, by the speed and visibility model of the one or more controllers, the probabilistic longitudinal velocity of the vehicle with respect to the current weather condition by limiting the constrained velocity based on a visibility distance;

determine, by a probabilistic lateral driving model stored by the one or more controllers, one or more lane choices for the vehicle with respect to the current weather condition based on a route plan of the vehicle and perception data indicative of an environment surrounding the vehicle;

select a final lane choice from the one or more lane choices, wherein the final lane choice includes a maximum probability of being selected at the probabilistic longitudinal velocity when compared to remaining lane choices that are part of the one or more lane choices;

determine a next state of the vehicle based on the final lane choice and the probabilistic longitudinal velocity;

receive a road segment that is part of the route plan, wherein the road segment includes an intersection;

determine the vehicle is able to execute a maneuver at the intersection based on the perception data; and in response to determining the vehicle is able to execute the maneuver, instruct the vehicle to execute the maneuver by assisting with steering, braking, and accelerating.

20. The hybrid probabilistic driving behavior modeling system of claim 19, wherein the probabilistic lateral driving model classifies a current road segment that is part of a road plan as including either a necessary lane change or a free lane change.

*    *    *    *    *